March 17, 1959 R. L. HANDY ET AL 2,877,647
SOIL TESTING APPARATUS
Filed May 26, 1955 2 Sheets-Sheet 2

INVENTORS.
RICHARD L. HANDY
DONALD T. DAVIDSON
BY
Rudolph L. Lowell
ATTORNEY.

United States Patent Office 2,877,647
Patented Mar. 17, 1959

2,877,647

SOIL TESTING APPARATUS

Richard L. Handy and Donald T. Davidson, Ames, Iowa, assignors to Iowa State College Research Foundation, Inc., Ames, Iowa, a corporation of Iowa Application May 26, 1955, Serial No. 511,179

2 Claims. (Cl. 73—149)

This invention relates generally to soil testing apparatus and more particularly to apparatus for use in making in-place tests of soil.

In making in-place tests for soil density, moisture content, etc., the usual procedure is to dig or auger a cavity in a ground surface, weigh the soil removed from the cavity, and measure the volume of the cavity. Various kinds of apparatus are used for making such tests. However, all of such apparatus has been limited to use on fairly level surfaces, has been difficult to transport, and has been subject to various other objections.

An object of this invention, therefore, is to provide improved apparatus for use in making soil tests.

Another object of this invention is to provide soil testing apparatus which can be used to make tests either on level, sloping, or vertical ground surfaces, so that the apparatus can be used in making tests in road cuts, quarry faces, basement excavations and other locations deep in a soil section.

A further object of this invention is to provide apparatus for use in making soil tests which includes a balloon which is expanded into contact with the wall of a cavity formed in a ground surface by supplying a measured quantity of fluid to the balloon for measuring the volume of the cavity.

Still a further object of this invention is to provide apparatus for use in making in-place tests of soil which is rugged yet light and compact in construction, simple and economical to manufacture, and efficient in operation to accurately and quickly determine the volume of a cavity in a ground surface.

Further objects, features and advantages of this invention will become apparent from a consideration of the following description when taken in connection with the accompanying drawing in which.

Figure 1:
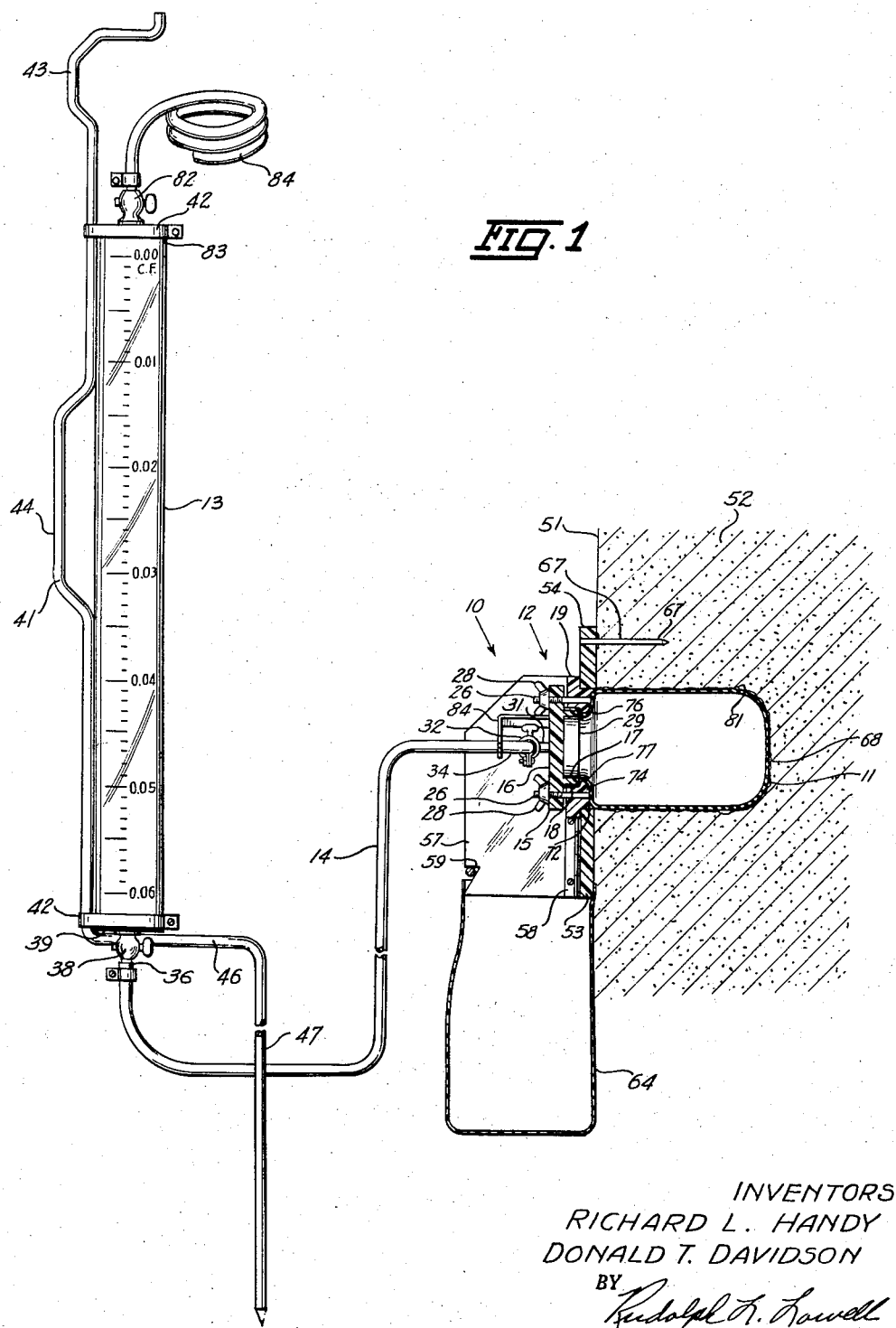
Fig. 1 is a side elevational view of the soil testing apparatus of this invention, with portions of the apparatus shown in section for the purpose of clarity.

With reference to the drawing, the soil testing apparatus of this invention, indicated generally at 10, is illustrated in Fig. 1 as including an ordinary rubber balloon 11, having the neck end thereof cut off, and carried on a balloon supporting unit 12 arranged in fluid communication with an upright fluid reservoir or cylinder 13 through a flexible line 14.

Figure 3:
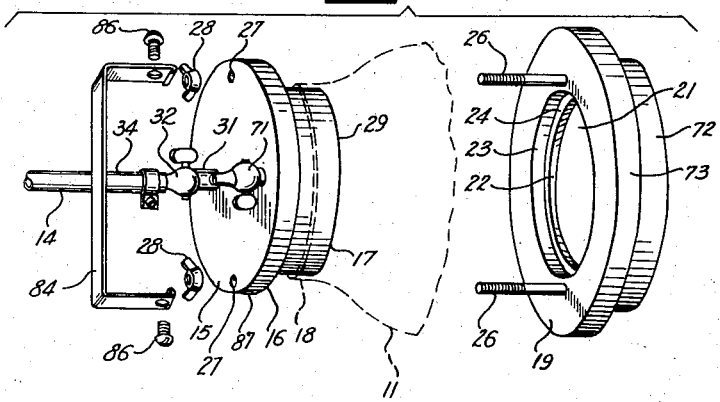
Fig. 3 is an enlarged exploded perspective view of another portion of the apparatus shown in Fig. 1.

The unit 12 (Figs. 1 and 3) includes a balloon holding member 16 having a disc member 15 provided with a short tubular projection 17 about which the open end portion 18 of the balloon 11 is extended. A clamping ring 19, formed with a central opening 21 is received about the projection 17 and the balloon end portion 18 for clamping the balloon 11 on the holder 16. The holder 16 and ring 19 are preferably formed of Plexiglas so as to be light and durable.

The opening 21 in the clamping ring 19 is formed in two sections, namely, a reduced end section 22 and an enlarged end section 23. A projection or stop 24 is thus formed on the inner peripheral surface of the clamping ring 19 at the juncture of the sections 22 and 23.

In the assembly of the clamping ring 19 with the holder 16, a pair of studs 26, secured to and extended longitudinally of the clamping ring 19 are received in corresponding openings 27 (Fig. 3) formed in the disc member 15 of the balloon holder 16. A pair of wing nuts 28 for the studs 26 function to hold or clamp the end 29 of the tubular projection 17 against the stop 24 on the clamping ring 19, with the balloon end portion 18 therebetween. It is seen, therefore, that the end portion 18 is securely clamped about the tubular projection 17 by virtue of the tight fit of the ring 19 on the projection 17 and the action of the studs 26 and nuts 28 to hold the projection against the ring stop 24.

A fluid inlet connection 31 on the holder 16 includes a fluid control valve 32 mounted on the disc member 15 and connected to one end 34 of the fluid line 14. The opposite end 36 of the line 14 is connected to a valve 38 secured to the lower end 39 of the fluid reservoir 13.

The fluid reservoir 13 is of a clear Plexiglas construction and is calibrated, in hundredths of a cubic foot, to indicate the volume of water therein. A combination carrying and supporting rod 41, of an irregular shape, is attached, by means of clamps 42, to opposite ends of the reservoir 13. The rod 41 has an offset end portion 43 and an offset intermediate portion 44 which function as handles to facilitate transport of the reservoir 13. A laterally projected portion 46 of the rod 41 extends across the lower end 39 of the reservoir 13 and terminates in a pointed end or leg supporting portion 47 extended longitudinally of the reservoir 13. By exerting downward foot pressure on the rod portion 46, to force the end portion 47 into the ground, the reservoir 13 is readily ground supported in an upright position.

In use, a smooth, flat face or surface 51 (Fig. 1) is scraped on the ground or soil 52 to be tested. Although the apparatus 10 is illustrated in Fig. 1 in use on the vertically disposed face 51, it is to be understood that the apparatus 10 is equally adapted for use on horizontal or inclined faces.

Figure 2:
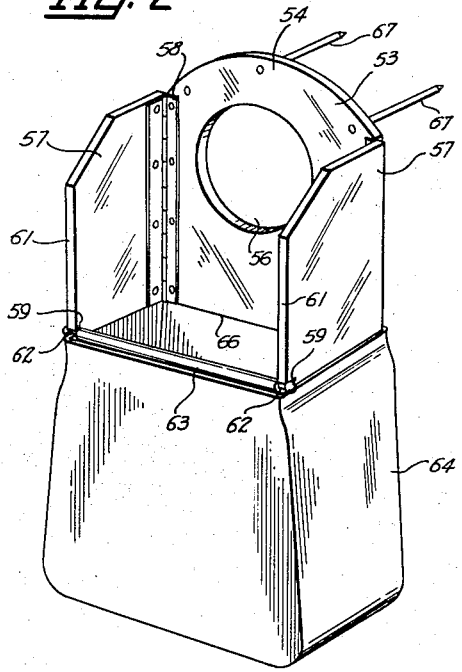
Fig. 2 is an enlarged perspective view of a portion of the apparatus shown in Fig. 1.

A template or plate member 53, of a clear Plexiglas construction, has a flat body portion 54, formed with an opening 56, and side portions 57 connected to opposite sides of the body portion 54 by hinges 58 (only one of which is shown). A pair of notches 59 in the outer ends 61 of the template side portions 57 receive the recessed end portions 62 of a spacer pin 63 which maintains the side portions 57 in the parallel spaced positions shown in Fig. 2. A sample bag 64, of a paper or polyethylene plastic material, is positioned about the body portion 54 and end portions 57 at the end 66 of the template 53 for a purpose to appear later.

The template body portion 54 is moved to a position flat against the smooth soil surface 51 and held thereon by forcing into the soil 52, pins 67 (Figs. 1 and 2), carried by the body portion 54. In the event the template body portion 54 does not fit flat against the soil face 51, the template is removed and the soil surface 51 is again smoothed and the template body portion 54 is re-positioned against the surface 51. The Plexiglas construction of the template 53 facilitates the flat mounting of the body portion 54 against the surface 51 since any irregularities in the surface 51 are easily seen through the template 53.

Using the opening 56 in the template 53 as a guide, a cavity 68 is cut in the soil 52, by the use of an auger, or a spoon or the like (not shown). The soil removed in forming the cavity 68 falls downwardly on the template body portion 54 and between the side portions 57 into the bag 64 which is then removed from the template 53 and weighed. In testing soil on a horizontal or nearly horizontal face, the soil is readily pushed or scraped off the template 53 into the bag 64.

It is seen, therefore, that the template 53 provides for the forming of a cavity 68 of a diameter substantially equal to the diameter of the template opening 56 so that the cavity 68 constitutes an extension of the opening 56. Further, the template 53 supports the sample bag 64 which receives the soil removed in forming the cavity 68 to capture all of the removed soil.

Prior to the assembly of the balloon 11 and the ballon supporting unit 12 with the template 53, air is removed from the balloon 11 by opening an air valve 71 arranged on the disc member 15 in a side by side relation with the fluid control valve 32. With the fluid control valve 32 maintained in a closed position, the balloon 11 is manually squeezed to force the air therein outwardly through the valve 71 which is then closed.

The balloon support unit 12, with the balloon 11 clamped thereto, is then assembled with the template 53. The clamping ring 19, which has an inner end section 72 of a reduced diameter relative to an outer end section 73, is moved to a position in which the section 72 is frictionally received within the opening 56 and the enlarged outer end section 73 of the clamping ring 19 is against the template body portion 54. In this position of the clamping ring 19, the inner end 74 (Fig. 1) of the clamping ring 19 is substantially aligned with the soil surface 51. A smoothly contoured recess or cavity 76 formed in the inner end 74 of the clamp ring 19 eliminates any sharp corners on the ring 19 at the inner end 74 thereof. Thus, the recess 76, which is coextensive in size with the ring end section 72, provides a smoothly contoured inner surface 77 for the ring 19 for a purpose to appear later.

With the reservoir 13 supported on the rod portion 47 or held in an upright position above the balloon 11, the valves 32 and 38 at the ends of the fluid line 14 are opened to provide for a flow of fluid from the reservoir 13 into the balloon 11. Fluid entering the balloon expands the balloon into contact with the cavity wall 81 and the smoothly contoured inner ring surface 77. By virtue of the smooth contour of the surface 77, the expansion of the balloon 11 to conform to the contour of the surface 77 is facilitated without any danger of breakage of the balloon 11. The fluid level in the reservoir 13, which level is clearly apparent by virtue of the Plexiglas construction of the reservoir 13, gradually recedes as the balloon 11 is filled with fluid. When the operator observes that the fluid level has stopped receding, a valve 82 at the upper end 83 of the reservoir 13 is opened. The operator then blows through a flexible tube 84 on the valve 82 to increase the pressure on the fluid in the reservoir 13. A complete expansion of the balloon 11 into engagement with a cavity wall 81 is thus assured.

When the operator is certain that a complete expansion of the balloon 11 has been completed, the valves 32 and 38 are closed and the level of the fluid in the reservoir 13 is recorded. The volume within the tubular projection 17 and the recess 76, which are known, are then subtracted from the fluid level reading to indicate the volume of the cavity 68. By comparing this volume with the weight of the soil in the bag 64 the soil density is readily determined. Also, on drying of the soil in the bag 64 either in an oven or by the alcohol burning method, and comparing the weight of the wet soil with the weight of the dry soil and the volume of the cavity 68, the moisture content of the soil is readily determined.

To prepare the apparatus 10 for re-use, the balloon supporting unit 12 along with the balloon 11 are withdrawn from the cavity 68 and the template 53. A U-shape handle 84 releasably secured to the balloon holder 16 by means of screws 86 extend through the handle 84 and received in openings 87 (only one of which is shown) in the disc member 15 facilitates the removal and transport of the unit 12. The valves 32 and 38 are opened and the unit 12 and the fluid filled balloon 11 are elevated to a position above the reservoir 13 thereby causing a return flow of fluid to the reservoir. The valves 32 and 38 are then closed and the reservoir 13 is withdrawn from its supported position on the ground surface for convenient transport and re-use.

The template 53 is readily folded by virtue of the hinged support of the end portions 57 on the body portion 54. As a result of the Plexiglas construction of the balloon supporting unit 12, reservoir 13 and template 53, the apparatus 10 is of a light weight and is readily transported. Further, the clear characteristic of the Plexiglas material provides for the operation of the apparatus 10 being readily visible at all times by the operator.

From the above description, it is seen that this invention provides a testing apparatus 10 which is readily operable to accurately determine the volume of a ground surface cavity 68 in an in-place soil testing operation.

Although the invention has been described with respect to a preferred embodiment thereof, it is to be understood that it is not to be so limited, since changes can be made therein which are within the full intended scope of this invention as defined by the appended claims.

We claim:

1. Apparatus for measuring the volume of a cavity having an inlet opening in a flat ground surface, comprising, a flat template having an opening extended therethrough of a size substantially equal in size to the inlet opening of said cavity, with said template being adapted to be positioned flat against said ground surface with the opening therein substantially concentric with said inlet opening so as to constitute an outward extension of said inlet opening, a balloon receivable within said cavity, a ring unit for supporting said balloon frictionally received within said template opening, said ring unit having an inner surface forming a circular recess of known volume and an inner side facing said cavity inlet opening, the junction between said inner surface and said inner side being of an arcuate contour, said balloon adapted to be positioned within said cavity with the open end portion thereof supported on said ring unit in a fluid tight relation therewith so that the open end portion of the balloon is adapted to engage the junction and the inner surface of said ring unit, and fluid reservoir means in fluid communication with said balloon for directing a measured volume of fluid into the balloon for expanding the balloon into engagement with the walls of said cavity and said recess.

2. Apparatus for measuring the volume of a cavity having an inlet opening in a flat ground surface, comprising, a flat template having an opening extended therethrough of a size substantially equal to the inlet opening of said cavity, with said template being adapted to be positioned flat against said ground surface with the opening therein substantially concentric with said inlet opening so as to constitute an outward extension of said inlet opening, a balloon adapted to be positioned within said cavity with the open end portion thereof extended outwardly through said template opening, means adapted to be secured to said template for supporting said balloon open end portion including, a ring member adapted for frictional engagement in said template opening, said ring member having a first circular section adjacent said inlet opening and a second circular section integral with and facing away from said inlet opening, said first section having an inner side facing said inlet opening and an inner surface forming a first circular bore, the junction of said inner side and inner surface being of an arcuate contour, said second section having an inner surface forming a second circular bore of a diameter larger than said first bore whereby a shoulder is formed between said first and second bores, a member having a wall portion and a short tubular projection extended therefrom, said tubular projection having an outer diameter slightly smaller than said second circular bore, said member adapted to be secured to said second section whereby said tubular projection is inserted into said second bore adjacent said shoulder and whereby a recess is formed extended longitudinally from the said inner side of said first section to said wall portion, said recess having a known volume, said balloon open end portion adapted to be securely held between said second circular bore and said tubular projection in a fluid tight manner and engageable with said first circular bore and said rounded junction, and fluid reservoir means in fluid communication with said balloon for directing a measured volume of fluid into the balloon for expanding the balloon into engagement with the walls of said cavity and said recess.

References Cited in the file of this patent

UNITED STATES PATENTS

| | | |
|---|---|---|
| 2,270,505 | Burleson | Jan. 20, 1942 |
| 2,314,540 | Huntington | Mar. 23, 1943 |
| 2,606,442 | Baines | Aug. 12, 1952 |
| 2,667,782 | Shea | Feb. 2, 1954 |

OTHER REFERENCES

"Public Roads," vol. 22, No. 12, page 280.